US007410705B2

(12) United States Patent
Shipton

(10) Patent No.: US 7,410,705 B2
(45) Date of Patent: Aug. 12, 2008

(54) RARE EARTH-TRANSITION METAL ALLOY ARTICLES

(75) Inventor: Mark H. Shipton, deceased, late of Bristol (GB); by J. M. Shipton, legal representative, Bristol (GB)

(73) Assignee: Rolls-Royce PLC, London (GB)

( * ) Notice: Subject to any disclaimer, the term of this patent is extended or adjusted under 35 U.S.C. 154(b) by 363 days.

(21) Appl. No.: 10/540,536

(22) PCT Filed: Nov. 26, 2003

(86) PCT No.: PCT/GB03/05152

§ 371 (c)(1),
(2), (4) Date: Jul. 29, 2005

(87) PCT Pub. No.: WO2004/064088

PCT Pub. Date: Jul. 29, 2004

(65) Prior Publication Data

US 2006/0141289 A1 Jun. 29, 2006

(30) Foreign Application Priority Data

Jan. 14, 2003 (GB) ................................ 0300771.3

(51) Int. Cl.

| | |
|---|---|
| ***B32B 15/04*** | (2006.01) |
| ***B32B 15/18*** | (2006.01) |
| ***B05D 3/02*** | (2006.01) |
| ***B05D 5/00*** | (2006.01) |
| ***H01F 1/00*** | (2006.01) |
| ***H01F 41/32*** | (2006.01) |

(52) U.S. Cl. ....................... 428/469; 428/632; 428/633; 428/472.3; 428/681; 428/704; 427/127; 427/331; 148/301

(58) Field of Classification Search ................. 428/812, 428/813, 814, 678, 680, 681, 685, 928, 632, 428/633, 472.3, 469, 704; 427/127, 189, 427/190, 331; 148/300, 301
See application file for complete search history.

(56) References Cited

U.S. PATENT DOCUMENTS

| | | | | |
|---|---|---|---|---|
| 5,569,336 | A * | 10/1996 | Takahashi | 148/302 |
| 5,830,815 | A | 11/1998 | Wagh et al. | |
| 6,133,498 | A | 10/2000 | Singh et al. | |
| 6,451,132 | B1 | 9/2002 | Walmer et al. | |
| 2002/0084440 | A1* | 7/2002 | Ohmori et al. | 252/62.54 |
| 2002/0197512 | A1* | 12/2002 | Aizawa et al. | 428/693 |

FOREIGN PATENT DOCUMENTS

| | | |
|---|---|---|
| EP | 1 032 000 A1 | 8/2000 |
| JP | A-2001-295091 | 10/2001 |

OTHER PUBLICATIONS

Christina H. Chen et al.; "Surface Reaction and Sm Depletion at 550° C. for High Temperature Sm-Tm Magnets"; *IEEE Transactions on Magnetics*; vol. 37, No. 4; Jul. 2001; pp. 2531-2533.

* cited by examiner

*Primary Examiner*—Michael La Villa
(74) *Attorney, Agent, or Firm*—Oliff & Berridge, PLC

(57) ABSTRACT

A phosphate bonded ceramic is used to provide a protective coating on a rare earth-transition metal (RE-TM) alloy substrate, conferring degradation resistance to the alloy by being oxidation resistant and acting as a diffusion barrier, thereby minimising/preventing oxygen diffusion and elemental depletion. The alloy substrate may, for example, be a permanent magnetic alloy component and may be used in aerospace applications.

13 Claims, No Drawings

RARE EARTH-TRANSITION METAL ALLOY ARTICLES

The present invention relates to rare earth-transition metal (RE-TM) alloy articles having a protective coating, and particularly RE-TM based alloy high temperature permanent magnet components which have a ceramic diffusion barrier that is oxidation resistant. The invention also relates to a method of forming such protective coatings on RE-TM alloy articles.

High temperature permanent magnets made from RE-TM alloys are well known for use in a variety of applications, such as in motors and generators for aircraft and spacecraft systems, at temperatures above 200° C. The alloy used in these magnets may be represented by the general formula $RE(Co_w Fe_v Cu_x TM_y)_z$, where RE is a rare earth element and TM is a transition metal. Such magnets have also been used in actuators, inductors, inverters, magnetic bearings, and regulators for flight control surfaces and other aircraft components. Such applications have required magnets that can operate at temperatures up to about 300° C. In recent years there has been a need for magnetic and electromagnetic materials that are capable of reliable operation at elevated temperatures above 300° C., for example up to 550° C. Recently, a new class of $Sm(Co_w Fe_v Cu_x Zr_y)_z$ permanent magnetic materials has been developed to produce magnets for use up to 700° C. (U.S. Pat. No. 6,451,132, the content of which is hereby incorporated by reference in its entirety).

Exposure to such high temperatures presents problems because of the reactions that occur between the magnets and the environment. That is, surface oxidation and elemental depletion result in the degradation of magnetic properties.

In IEEE Trans. Magn. 37(4), 2531 (2001), Chen et al. conducted an investigation using SEM/EDXA and EPMA/ANDXA to study the microstructure formed in $Sm_2(Co,Fe,Cu,Zr)_{17}$ magnets after long term exposure to air at 550° C. It was found that the permanent magnetic loss observed was partly due to surface oxidation, but mainly due to Sm depletion. At the surface layer, Sm is lost by vaporisation, leaving an oxide of Fe—Co. However, Sm depletion also occurs in a zone between the surface layer and the matrix of the samples. In this affected zone, many Sm free Fe—Co—Cu stripes are formed as part of the process of Sm atoms migrating toward the surface layer and eventually evaporating.

Sputter-coated silica has been used as a coating for RE-TM permanent magnetic components. However, this material is extremely fragile and is not suitable for components that are subject to thermal cycling, which includes aerospace components.

In IEEE Trans. Magn. 37(4), 2531 (2001), Chen et al. teaches the application of a two-layer coating to various Sm-TM high temperature magnets before exposure at 550° C. in air. The top layer is a relatively dense Al coating, and the second layer is ceramic.

According to a first aspect of the present invention, there is provided a rare earth-transition metal (RE-TM) alloy structure comprising a RE-TM alloy substrate and a diffusion barrier disposed thereon, wherein the diffusion barrier comprises a phosphate bonded ceramic wherein the rare earth is samarium. The phosphate bonded ceramic acts as a barrier to a medium, such as oxygen, capable of degrading the substrate under the intended conditions of use, substantially preventing the medium from contacting the underlying substrate, at least in degradative amounts.

Structures according to the first aspect of the present invention may be used as high temperature permanent magnets, for applications in the aerospace industry which may include operation at elevated temperatures, for example at temperatures above 200° C. The present invention also extends to permanent magnet components, particularly aerospace components, such as components of electronic aerospace engines. For example, the permanent magnet components of the invention may be used in motors or generators for aircraft and spacecraft systems. They may also be used in, for example, actuators, inductors, inverters, magnetic bearings, or regulators for flight control surfaces and other aircraft components.

According to a second aspect of the present invention, there is provided a method of forming a diffusion barrier on a rare earth-transition metal (RE-TM) alloy substrate, the method comprising applying to the alloy substrate a coating comprising a source of a ceramic-forming metal oxide and a source of a phosphate binder for the metal oxide, and causing the metal oxide and the phosphate to cure to form a diffusion barrier comprising a phosphate bonded ceramic on the alloy substrate.

According to a third aspect of the present invention, there is provided a method of reducing rare earth metal depletion at the surface of a RE-TM permanent magnet, preferably a SM-TM high temperature permanent magnet, which method comprises providing over the surface a diffusion barrier composed of a phosphate bonded ceramic.

In its first aspect, the invention relates to a RE-TM alloy structure in which a diffusion barrier comprising a phosphate bonded ceramic is disposed on the alloy substrate. In its broadest aspect, the diffusion barrier may be disposed over a portion of the alloy substrate, for example a portion of the surface of the alloy substrate which is to be exposed to conditions which would otherwise result in surface degradation. In some embodiments of the present invention, the whole of the alloy substrate will be provided with the diffusion barrier.

The RE-TM alloy used may be an alloy in which RE is a rare earth element selected from the group consisting of Sm, Gd, Pr, Nd, Dy, Ce, Ho, Er, La, Y, Tb, and mixtures thereof, and TM is a transition metal selected from the group consisting of Zr, Hf, Ti, Mn, Cr, Nb, Mo, W, V, Ni, Ta, and mixtures thereof. Preferably, the alloy is one in which the rare earth metal is Sm, as for example represented by the formula $Sm_2TM_{17}$. Preferably, the transition metal components are Co, Fe, Cu and Zr.

The present invention may be used with the RE-TM alloys as taught in U.S. Pat. No. 6,451,132 which are useful as permanent magnets in high temperature applications. For example, U.S. Pat. No. 6,451,132 teaches preferred alloy compositions having the general formula $RE(Co_w Fe_v Cu_x T_y)_z$, where RE is a rare earth element selected from the group separately and either applied separately or mixed into the coating composition immediately before application. In other cases, curing needs to be initiated, for example by pressure and/or thermally by heating to an elevated temperature (eg above about 50° C., more typically between about 100 and about 500° C.). In those cases, the coating composition can be prepared in advance, shipped and stored prior to application in one coating step.

The method of forming the phosphate bonded ceramic on the substrate will now be discussed in further detail.

The composition suitably comprises a liquid carrier entraining the oxide source and the phosphate source, enabling the components of the diffusion barrier to be applied in a generally uniform and well dispersed manner as the coating on the alloy substrate surface before curing takes place.

It is preferred that the coating composition is applied to the alloy substrate in one step, with all the components of the diffusion barrier present in that step. Such a coating composition will typically either be prepared immediately before application, or will use components that require an initiation step to promote curing. The choice between different systems is well within the ability of those of skill in this art.

The physico-chemical properties of the carrier will be selected according to the specific conditions of use, as will be well understood by those of skill in this art.

For example, the carrier may conveniently be chosen such that the coating composition has a rheology (ie viscosity and thixotropy) providing good nozzle-non-blocking sprayability or good brush-, blade- or roller-spreadability onto the alloy substrate, resulting in good, uniform application to the substrate surface. The viscosity of the liquid carrier may be selected to restrict sedimentation of any entrained particles prior to use.

The carrier may suitably comprise rheology modifiers such as clays (eg organoclays such as bentonite), to assist in maintaining the desired viscosity and thixotropy.

The surface tension of the coating composition may, if desired, be adjusted by means of surfactants, to optimise the application performance of the composition and the uniformity of the applied coating prior to reaction treatment to form the diffusion barrier. Such adjustments will be well within the capability of those skilled in this art.

The oxide source may suitably be selected from an inorganic oxide or hydroxide, and more particularly an oxide or hydroxide of a transition metal, an alkali metal, a Group IIIB metal or an alkaline earth metal. Suitable oxides and hydroxides include, for example, those of magnesium, aluminium, iron, chromium, sodium, zirconium or calcium, or any mixture or chemical or physical combination thereof. An oxide may suitably be used in powder form, and may for example be pre-treated (eg heated, calcined and/or washed), which has been found in some cases to improve the resultant ceramic. Where the oxide is a calcined oxide, the calcination temperature may suitably be in the range of about 500 to about 1500° C.

The phosphate source will preferably comprise phosphoric acid and/or a phosphate, such as, for example, a phosphate of potassium, aluminium, ammonium, beryllium, calcium, iron, lanthanum, lithium, magnesium, magnesium-sodium, magnesium-potassium, sodium, yttrium, zinc, zirconium, or any mixture or chemical or physical combination thereof. The phosphate may suitably be an acid phosphate. The phosphate source may be present in an amount of at least about 10 wt %, for example at least about 15 wt %. The phosphate source is normally present in an amount up to about 35 wt %, for example up to about 25 wt %. In a preferred embodiment, the phosphate source comprises phosphoric acid, magnesium hydrogen phosphate, or a mixture thereof.

The coating composition is preferably a liquid aqueous dispersion, which preferably has an acidic pH. This dispersion normally has a water content of at least about 40 wt %, for example at least about 45 wt %. The water content is normally up to about 75 wt %, for example up to about 65 wt %, preferably up to about 55 wt %.

The coating composition may, if desired, include a cure-rate retardant, as will be known to those skilled in this art. Retardants serve to reduce the rate of ceramic formation, which can extend the period of time over which the pre-cure composition remains in a fluid state for application to the alloy substrate and can reduce the maximum temperature attained in the strongly exothermic, acid-base, ceramic-forming reaction, eg to less than about 100° C. Examples of suitable retardants include pH raisers or buffers such as carbonates, bicarbonates or hydroxides of monovalent metals such as sodium, potassium or lithium, particularly when phosphoric acid is used as the phosphate source. Such a system is described in U.S. Pat. No. 5,830,815, the disclosure of which is incorporated herein by reference. As retardant there may also be used one or more oxidising agent, reducing agent, or any mixture thereof. For example, as described in U.S. Pat. No. 6,133,498, the disclosure of which is incorporated herein by reference, an oxidising agent or a reducing agent can advantageously control the ceramic-forming reaction. It is believed that reduction of the oxidation state of the metal in oxide sources based on transition metals is a primary contributor to this effect. Examples of suitable reducing agents include those listed in the said U.S. patent. As described in the said U.S. patent, boric acid may be used to control the reaction rate.

Solid components of the dispersion will typically include the oxide source and, when present, the clay. It is preferred that any particles have an average effective diameter greater than about 1 μm, for example greater than about 2 μm. Normally, the average effective particle size will be less than about 6 μm, for example less than about 4 μm. In the case of non-spherical particles, particle size is taken as the equivalent spherical diameter of the particle. Particle size may be measured by any technique commonly used in the art, for example dynamic light scattering or scanning electron microscopy (SEM).

The insoluble components may suitably be pre-ground to the desired particle size as necessary, by conventional grinding procedures.

The coating composition preferably consists essentially of the oxide source, the phosphate source, water, and optionally one or more of rheology modifiers, buffers, pH reducers, oxidising agents, reducing agents, other cure retardants or surfactants, with less than about 10%, more particularly less than about 5%, by weight of other ingredients.

The oxide source and the phosphate source may be provided at any suitable molar ratio, and the suitable molar ratios will be well appreciated by those skilled in this art, in view of the well-understood chemistry of the phosphate bonding process. For example, the oxide source and the phosphate source may be provided in a molar ratio ranging from about 0.3:1 to about 3:1. The water is preferably the predominant single component of the coating composition, preferably constituting at least about 30% by weight of the composition, eg between about 35 and about 80% by weight.

In one preferred embodiment, the coating composition has substantially the following composition:

water (preferably 45-55 wt %)
phosphoric acid (preferably 15-25 wt %)
chromium trioxide (preferably 1-2 wt %)
chromium oxide (preferably 15-25 wt %)
clay (bentonite) (preferably 0.5-1 wt %)
magnesium oxide (preferably 2-3 wt %)
magnesium hydrogen phosphate (preferably 4-5%).

Such a material is commercially available as IPSEAL (Indestructible Paint Co. Limited, Birmingham, UK; web: www.indestructible.co.uk). This material generally requires thermal cure-initiation, typically at about 350° C. for about 1 hour.

The coating composition is prepared by conventional mixing techniques, the components being present in the desired molar ratio, as will be well understood by those skilled in this art. If A and B component parts of the coating composition need to be mixed together immediately prior to application, this will be done in the conventional manner.

The composition may be applied to the substrate using any convenient application technique. Typically, spraying, brushing, blade-spreading or roller spreading may be used. In a particularly preferred embodiment, the composition(s) may be applied using a conventional aerosol spraying device comprising a nozzle through which the composition is delivered under pressure, whereby the composition forms an aerosol of fine dispersed droplets in the air.

The surface of the alloy to be treated may first be abrasive blasted in a manner known per se.

The coating may be applied in one or more application steps. A single application step is preferred. However, when more than one successive application step is used, the coating will preferably be built up in the successive steps, each step comprising application of a layer (preferably substantially uniform in thickness and continuous) constituting a portion of the coating.

The applied layer of the liquid coating composition will preferably be up to about 25 μm in thickness prior to curing, eg between about 10 and about 15 μm in thickness. Generally speaking, the thickness of the coating layer should be somewhat greater than the particle sizes of the particulate components of the coating composition, to provide an even coating layer prior to curing.

It is preferable for the coating to be applied carefully, to result in a substantially continuous and uniform cover for the surface of the alloy substrate. This assists formation of a well bonded integral diffusion barrier after curing.

The coating may be applied to the whole or any one or more portions of the surface of the alloy substrate or structure. The selection of which surface region or regions require a diffusion barrier will be well within the ability of those skilled in this art.

Following application of the coating to the alloy substrate, the coating may dry naturally in ambient conditions before the curing reaction starts. The curing reaction may need to be initiated, for example at 350° C. for 1 hour, as previously described.

The deposited layer is then caused to cure, according to the requirements of the system being used, to form a ceramic diffusion barrier on the substrate.

The ceramic diffusion barrier is preferably in the form of a surface layer overlying the RE-TM alloy substrate, the layer being typically substantially homogeneous, continuous and of substantially uniform thickness.

The diffusion barrier formed according to the present invention may be overlay-coated by one or more further protective coatings, as will be readily apparent to those skilled in this art.

The present invention provides an improved or at least alternative degradation (eg oxidation and elemental depletion) resistant RE-TM alloy structure, together with a method for protecting RE-TM alloy substrates against such degradation damage. Magnetic alloy structures according to the present invention are particularly but not exclusively suitable for use in high temperature oxidative or corrosive environments such as aero-engines.

The invention claimed is:

1. A rare earth-transition metal (RE-TM) alloy structure comprising a RE-TM alloy substrate and a diffusion barrier disposed thereon, wherein the diffusion barrier comprises a single layer coating comprising a phosphate bonded ceramic;

the phosphate bonded ceramic is the reaction product of a ceramic forming metal oxide and a phosphate source;

the rare earth is samarium; and the ceramic coating is in contact with the alloy substrate on one side of the ceramic coating, the opposite side of the ceramic coating being exposed to the exterior environment.

2. A structure according to claim 1, wherein the RE-TM alloy is a Sm-Co-Cu-Fe-Zr magnetic alloy.

3. A structure according to claim 1, wherein the phosphate bonded ceramic diffusion layer is formed by a method which comprises applying to the alloy substrate a coating comprising a source of a ceramic-forming metal oxide and a source of a phosphate binder for the metal oxide, and causing the metal oxide and the phosphate to cure to form a diffusion barrier comprising a phosphate bonded ceramic on the alloy substrate.

4. A structure according to claim 1, which is a permanent magnet article.

5. A permanent magnet article of claim 4 which is an aerospace component.

6. A method of forming a single layer diffusion barrier on a rare earth-transition metal (RE-TM) alloy substrate, the method comprising:

applying to the alloy substrate a coating comprising a source of a ceramic-forming metal oxide and a source of a phosphate binder for the metal oxide; and causing the metal oxide and the phosphate to cure to form a diffusion barrier comprising a phosphate bonded ceramic on the alloy substrate;

wherein the diffusion barrier is in contact with the alloy substrate on one side of the ceramic coating, the opposite side of the diffusion barrier being exposed to the exterior environment; and the rare earth transition metal is samarium.

7. A method according to claim 6, wherein the coating is applied in one step.

8. A method according to claim 6, wherein the coating is applied as an acidic aqueous medium comprising the oxide source and the phosphate source.

9. A method according to claim 6, wherein the oxide source is selected from oxides and hydroxides of magnesium, aluminium, iron, chromium, sodium, zirconium and calcium, and any mixture or chemical or physical combination thereof.

10. A method according to claim 9, wherein the oxide source is selected from magnesium oxide, chromium oxide and mixtures thereof.

11. A method according to claim 6, wherein the phosphate source is selected from phosphoric acid and phosphates of potassium, aluminium, ammonium, beryllium, calcium, iron, lanthanum, lithium, magnesium, magnesium-sodium, magnesium-potassium, sodium, yttrium, zinc, zirconium, and any mixture or chemical or physical combination thereof.

12. A method according to claim 6, wherein curing of the coating is initiated by heating the coating.

13. A method of reducing rare earth metal depletion at the surface of a RE-TM permanent magnet, which method comprises:

providing over the surface a single layer diffusion barrier composed of a phosphate bonded ceramic; wherein the phosphate bonded ceramic is the reaction product of a ceramic forming metal oxide and a phosphate source;

the diffusion barrier is in contact with the surface on one side of the ceramic coating, the opposite side of the diffusion barrier being exposed to the exterior environment; and the rare earth transition metal is samarium.

* * * * *